United States Patent
Herman

(10) Patent No.: US 9,631,985 B2
(45) Date of Patent: Apr. 25, 2017

(54) TOTAL AIR TEMPERATURE SENSORS

(71) Applicant: Rosemount Aerospace Inc., Burnsville, MN (US)

(72) Inventor: Chad J. Herman, Chanhassen, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 564 days.

(21) Appl. No.: 14/184,290

(22) Filed: Feb. 19, 2014

(65) Prior Publication Data
US 2015/0103863 A1  Apr. 16, 2015

Related U.S. Application Data

(60) Provisional application No. 61/891,662, filed on Oct. 16, 2013.

(51) Int. Cl.
G01K 1/00 (2006.01)
G01K 13/02 (2006.01)

(52) U.S. Cl.
CPC .................. *G01K 13/028* (2013.01)

(58) Field of Classification Search
USPC ........................................ 374/138, 208, 148
See application file for complete search history.

(56) References Cited

U.S. PATENT DOCUMENTS 5,718,512 A * 2/1998 Ngo-Beelmann ...... G01K 13/02
  136/230
7,357,572 B2  4/2008 Benning et al.
7,828,477 B2  11/2010 Benning et al.
(Continued)

FOREIGN PATENT DOCUMENTS

EP       1837636 A1    9/2007
WO    WO 9425842 A1 * 11/1994  ............... G01K 1/08
WO    WO-2007/051108 A2   5/2007

OTHER PUBLICATIONS

A. Zukauskas, et al., Heat Transfer of a Cylinder in Crossflow, Table 19, Appendix pp. 188-189, Ed. G.F. Hewitt, 1985 Hemisphere Publishing Corp.
(Continued)

*Primary Examiner* — Mirellys Jagan
(74) *Attorney, Agent, or Firm* — Locke Lord LLP; Scott D. Wofsy; Alicia J. Carroll

(57) ABSTRACT

A total air temperature probe includes a probe body extending from a probe base to an opposed probe tip along a longitudinal axis defining a leading edge and opposed trailing edge, an interior flow passage aligned with longitudinal axis defined in probe body with an inlet defined on probe tip for fluid communication with interior flow passage, and an outlet for exhausting fluid out from interior flow passage. A sloped surface on probe tip extends from leading edge to trailing edge. A temperature sensor is mounted within interior flow passage for measuring temperature of flow through interior flow passage to determine total air temperature. Sloped surface is flush with leading edge and set in from trailing edge with respect to longitudinal axis to define a lip proximate the trailing edge. The sloped surface and lip are configured to create a high pressure region proximate inlet of interior flow passage.

21 Claims, 3 Drawing Sheets

(56) References Cited

U.S. PATENT DOCUMENTS

| | | | | |
|---|---|---|---|---|
| 8,100,582 B1* | 1/2012 | Powell | ............... | G01K 13/028 |
| | | | | 374/138 |
| 8,104,955 B2 | 1/2012 | Benning et al. | | |
| 2002/0122459 A1* | 9/2002 | McFarland | ............. | G01K 1/12 |
| | | | | 374/179 |
| 2007/0220984 A1* | 9/2007 | Slagle | ................. | G01K 13/02 |
| | | | | 73/708 |
| 2013/0022076 A1* | 1/2013 | Dijon | ................. | G01K 13/028 |
| | | | | 374/138 |
| 2014/0064330 A1* | 3/2014 | Agami | ............... | G01K 13/028 |
| | | | | 374/138 |
| 2015/0063414 A1* | 3/2015 | Wigen | ............... | G01K 13/028 |
| | | | | 374/138 |

OTHER PUBLICATIONS

European Search Report dated Mar. 17, 2015, issued on corresponding European Patent Application No. EP 14189237.2.

\* cited by examiner

TOTAL AIR TEMPERATURE SENSORS

CROSS-REFERENCE TO RELATED APPLICATIONS

This application claims priority to U.S. Provisional Patent Application No. 61/891,662 filed Oct. 16, 2013, which is incorporated by reference herein in its entirety.

BACKGROUND OF THE INVENTION

1. Field of the Invention

The present disclosure relates to total air temperature (TAT) probes or sensors. More particularly, the present disclosure relates to TAT probes subjected to the effects of in-flight icing.

2. Description of Related Art

Modern jet powered aircraft require very accurate measurement of outside air temperature (OAT) for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or ($T_S$), (2) total air temperature (TAT) or ($T_t$), (3) recovery temperature ($T_r$), and (4) measured temperature ($T_m$). Static air temperature (SAT) or ($T_S$) is the temperature of the undisturbed air through which the aircraft is about to fly. Total air temperature (TAT) or ($T_t$) is the maximum air temperature that can be attained by 100% conversion of the kinetic energy of the flight. The measurement of TAT is derived from the recovery temperature ($T_r$), which is the adiabatic value of local air temperature on each portion of the aircraft surface due to incomplete recovery of the kinetic energy. Recovery temperature ($T_r$) is obtained from the measured temperature ($T_m$), which is the actual temperature as measured, and which differs from recovery temperature because of heat transfer effects due to imposed environments.

Conventional TAT probes, although often remarkably efficient as TAT sensors, sometimes face the difficulty of working in icing conditions. Traditional TAT probes utilize a forward facing inlet scoop. During flight in icing conditions, water droplets, and/or ice crystals, are ingested into the TAT probe where, under moderate to severe conditions, they can accrete around the opening of the internal sensing element. An ice ridge can grow and eventually break free, clogging the sensor temporarily and causing an error in the TAT reading. To address this problem, conventional TAT probes have incorporated an elbow, or bend, to inertially separate these particles from the airflow before they reach the sensing element.

In addition, traditionally, anti-icing performance is also facilitated by heater elements embedded in the housing walls. Unfortunately, external heating also heats the internal air flow which, if not properly controlled, provides an extraneous heat source in the measurement of TAT. This type of error is commonly referred to as deicing heater error (DHE) or correction for DHE. Further, to overcome more severe icing conditions, the heating elements must achieve higher temperatures resulting in more power required to deice.

Some solutions for these challenges have been described in U.S. Pat. No. 7,357,572, U.S. Pat. No. 8,104,955, and U.S. Pat. No. 7,828,477, each of which is incorporated by reference herein in its entirety. Such conventional methods and systems have generally been considered satisfactory for their intended purpose. However, there is an ever present need in the art for improved TAT probe configurations. The present disclosure provides a solution for these problems.

SUMMARY OF THE INVENTION

A total air temperature (TAT) probe includes a probe body, an interior flow passage, a sloped surface and a temperature sensor. The probe body extends from a probe base to an opposed probe tip along a longitudinal axis and defines a leading edge and opposed trailing edge. The interior flow passage is aligned with the longitudinal axis defined in the probe body with an inlet defined on the probe tip for fluid communication of fluid into the interior flow passage, and an outlet for exhausting fluid out from the interior flow passage. The sloped surface is on the probe tip extending from the leading edge to the trailing edge. The sloped surface is flush with the leading edge and set in from the trailing edge with respect to the longitudinal axis to define a lip proximate the trailing edge. The sloped surface and the lip are configured to create a high pressure region proximate the inlet of the interior flow passage. The temperature sensor is mounted within the interior flow passage for measuring temperature of flow through the interior flow passage to determine total air temperature.

The probe body can be shaped as an elliptical cylinder and can have a cross-sectional shape perpendicular to the longitudinal axis that is elliptical. The interior flow passage can be cylindrical. It is also contemplated that the temperature sensor can be positioned to substantially avoid heat from the heated boundary region from the deicing heater for reduction of deicing heater error (DHE). Further, the TAT probe can include a thermal shield disposed between the interior flow passage and the temperature sensor. The thermal shield can be cylindrical and there can be clearance for fluid passage between the thermal shield and the interior flow passage.

The TAT probe can also include an impact port with a port inlet defined in the leading edge of the probe and a port passage defined in the probe in fluid communication with the port inlet. The impact port can be a pitot port. It is also contemplated that the TAT probe can include at least one deicing heater disposed in the probe body aft the port inlet configured to heat the port inlet and port passage by forming a heated boundary region to reduce ice buildup in the port inlet and port passage.

Further, the TAT probe can include a bleed passage defined in the probe body between the leading edge and the interior flow passage aligned with the longitudinal axis with a bleed inlet defined on the probe tip for fluid communication of fluid into the bleed passage, and a bleed outlet for exhausting fluid out from the bleed passage. The bleed inlet can be chevron shaped and the bleed passage can have a cross-sectional shape perpendicular to the longitudinal axis of a chevron. The bleed passage can be configured to reduce the heat from the heated boundary region reaching the temperature sensor. The bleed outlet can extend from the bleed passage in a plane perpendicular to the longitudinal axis, and in a plane at a sixty degree angle and at a thirty degree angle with respect to a major axis and a minor axis, respectively, of the cross-section of the probe body. It is also contemplated that there can be a plurality of bleed outlets for exhausting fluid out from the bleed passage. Each bleed outlet can extend separately from the bleed passage as described above.

It is also contemplated that the TAT probe can include a mounting boss and a mounting flange, operatively connecting the probe body to an engine. The mounting boss can have a diameter equal to or less than 0.75 inches (1.905 cm).

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figures 1, 2:
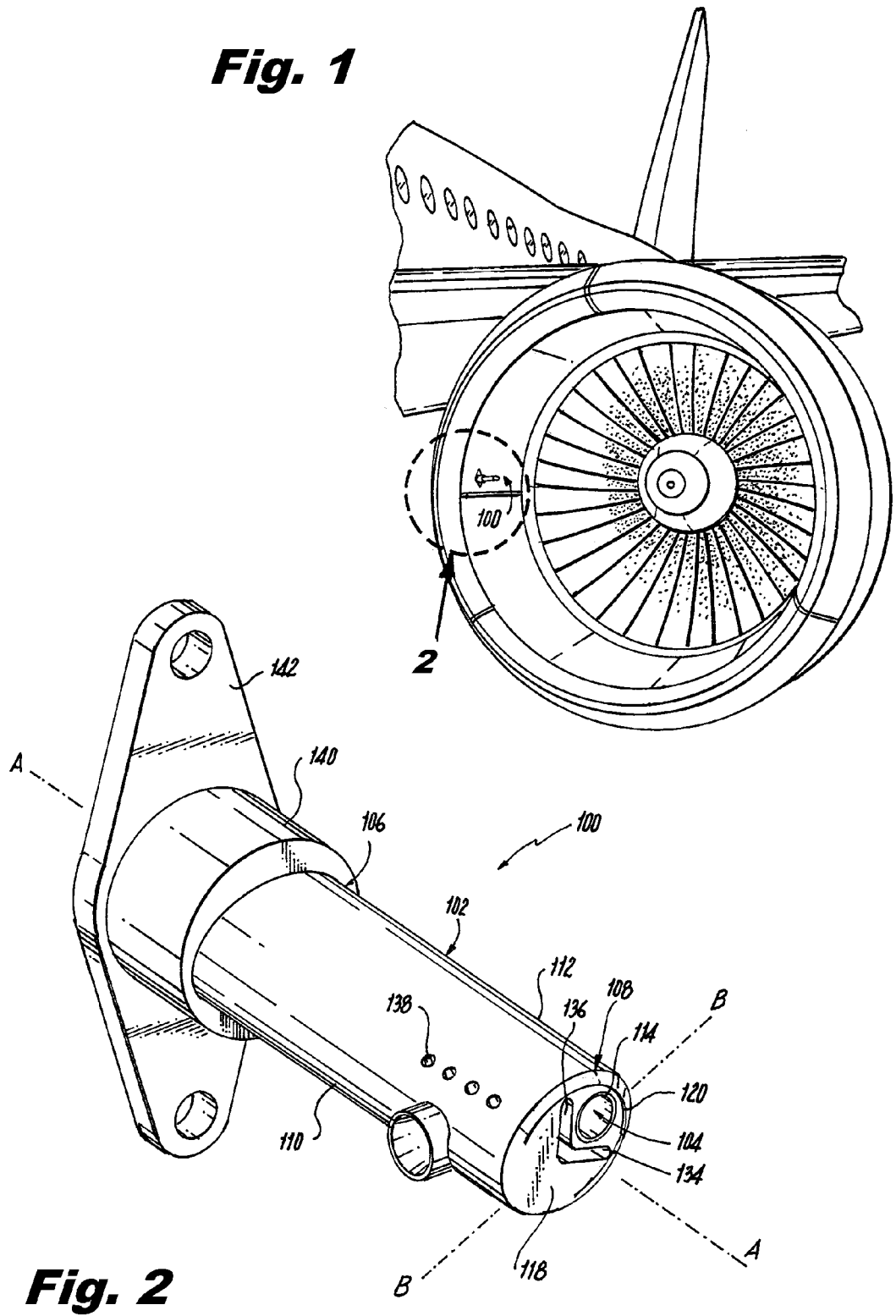
FIG. 1 is a perspective view of an exemplary embodiment of a total air temperature (TAT) probe constructed in accordance with the present disclosure, showing the TAT probe mounted on an aircraft.
FIG. 2 is an enlarged perspective view of the TAT probe of FIG. 1, showing the probe body, a mounting boss and a mounting flange.

Reference will now be made to the drawings wherein like reference numerals identify similar structural features or aspects of the subject disclosure. For purposes of explanation and illustration, and not limitation, a partial view of an exemplary embodiment of a total air temperature probe in accordance with the disclosure is shown in FIG. 1 and is designated generally by reference character 100. Other embodiments of total air temperature probes in accordance with the disclosure, or aspects thereof, are provided in FIGS. 2-5, as will be described. The systems and methods described herein can be used to reduce or eliminate deicing heater error (DHE) in total air temperature (TAT) probes.

Figure 5:
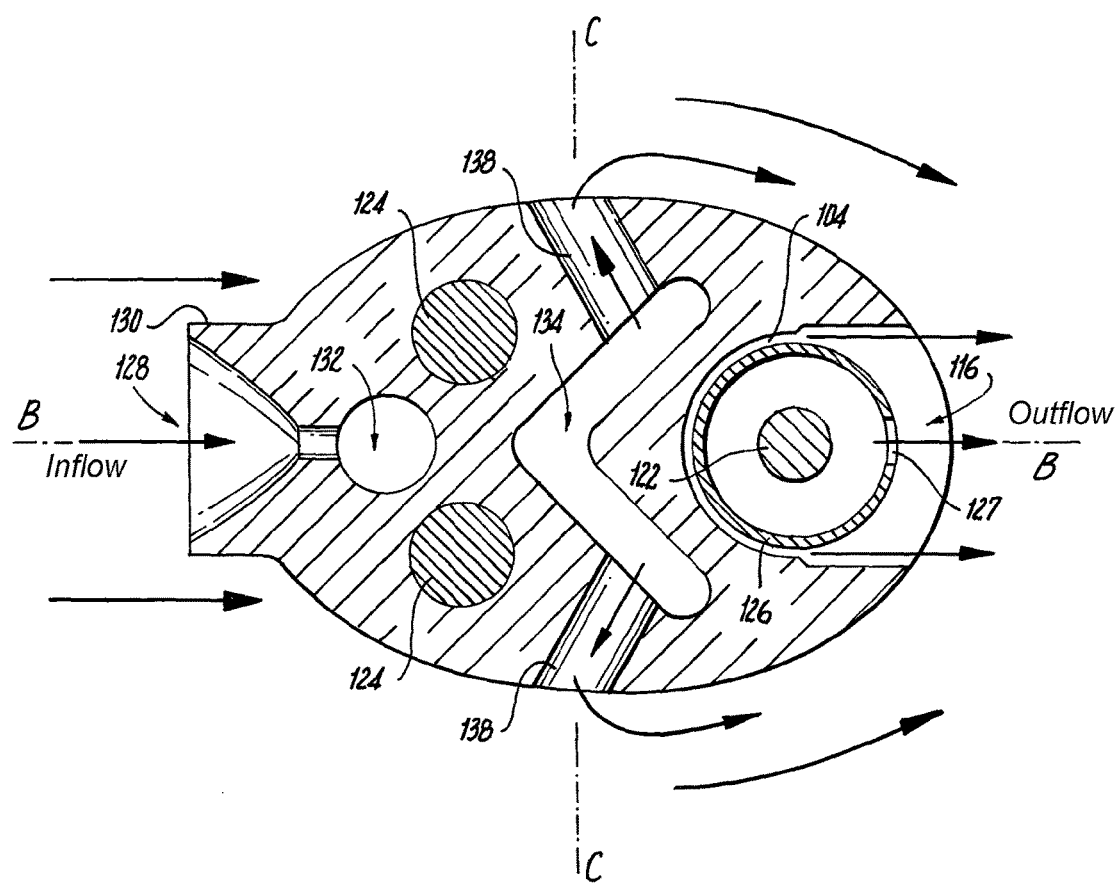
FIG. 5 is a cross-sectional end view of a portion of the TAT probe of FIG. 1, schematically showing how the heated boundary region avoids contacting the temperature sensor.

As shown in FIGS. 1 and 2, a TAT probe 100 includes a probe body 102, an interior flow passage 104, a sloped surface 118 and a TAT sensor 122, shown in FIG. 5. Probe body 102 extends from a probe base 106 to an opposed probe tip 108 along a longitudinal axis A and defines a leading edge 110 and opposed trailing edge 112. While probe body 102 is shown and described as the exemplary embodiment of an elliptical cylinder with a cross-sectional shape perpendicular to longitudinal axis A that is elliptical, those skilled in the art will readily appreciate that probe body 102 can be any suitable shape, such as, air foil shape, truncated air foil shape, circular shape, or oval shape. Those skilled in the art will readily appreciate that an elliptical cylinder probe body shape can tend to provide a negative pressure coefficient distribution at high angle of attack while maintaining the low trailing edge vortices and low drag found in traditional TAT probes.

With continued reference to FIGS. 1 and 2, TAT probe 100 includes a mounting boss 140 and a mounting flange 142, for connecting probe body 102 to an engine or other structures. It is contemplated that for small engine applications, for example, mounting boss 140 can have a diameter equal to or less than 0.75 inches (1.905 cm). Those skilled in the art will readily appreciate that while the shape and size of TAT probe 100 can easily fit into a small new engine installation envelope or retrofit engine installation envelope, i.e. equal to or less than 0.75 inches (1.905 cm), the size and shape can be scaled as needed to accommodate larger or smaller diameter installation envelopes in larger size engines as well as fuselage aircraft.

Figure 3:
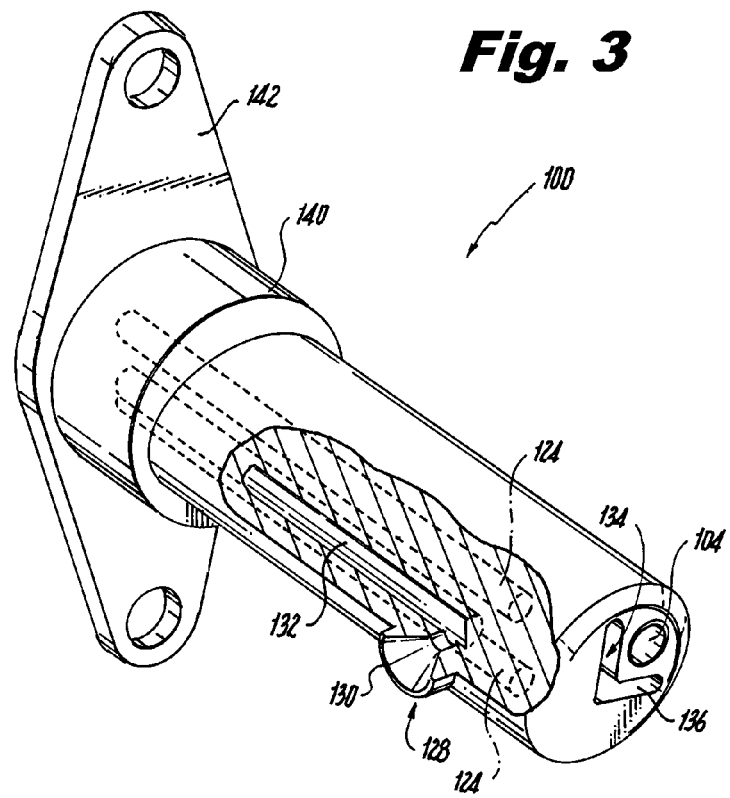
FIG. 3 is a partial cut-away perspective view of the TAT probe of FIG. 1, showing the impact port and deicing heaters.
Figure 4:
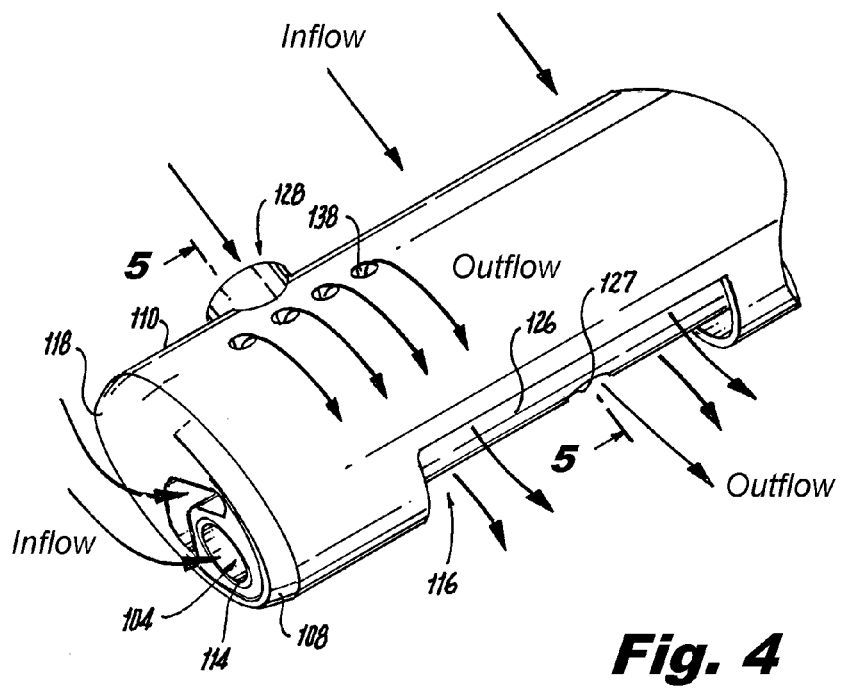
FIG. 4 is perspective view of a portion of the TAT probe of FIG. 1, schematically showing airflow through the probe body.

As shown in FIGS. 2-4, sloped surface 118 is on probe tip 108 extending from leading edge 110 to trailing edge 112. Sloped surface 118 is flush with leading edge 110 and set in from trailing edge 112 with respect to longitudinal axis A to define a lip 120 proximate trailing edge 112. Sloped surface 118 and lip 120 are configured to create a high pressure region proximate inlet 114 of interior flow passage 104. Those skilled in the art will readily appreciate that the high pressure region provides a larger pressure gradient between inlet 114 and outlet 116 for reliable flow through flow passage 104 to bathe TAT sensor 122 with a flow of air in a variety of conditions. Those skilled in the art will also readily appreciate that, because there is no inlet scoop in TAT probe 100 as found on traditional TAT probes, there is no direct inlet for airflow containing contaminants, such as water and ice, to enter interior flow passage 104. Thus, there is no need to heat the interior flow passage 104 or inlet 114 to prevent ice build-up, resulting in reduced DHE.

With reference now to FIGS. 2-3, TAT probe 100 includes an impact port 128, e.g. a pitot port, with a port inlet 130 defined in leading edge 110 of the probe and a port passage 132 defined in probe body 102 in fluid communication with port inlet 130. Pitot port 128 is configured to take a total pressure, $P_t$, measurement. Total air temperature probe 100 includes at least one deicing heater 124 disposed in probe body 102 aft port inlet 130 configured to heat port inlet 130 and port passage 132 by forming a heated boundary region to prevent excess ice buildup in port inlet 130 and port passage 132 and to ensure that the $P_t$ measurement is taken undisturbed. Probe body 102 is a relatively simple design to manufacture, and provides a more even heat distribution than that provided in a traditional TAT probe. Those skilled in the art will readily appreciate that deicing heater 124 does not have to be wrapped and brazed into place onto probe head 102, so probe head 102 can be fully machined, reducing variation that traditionally occurs when conventional TAT probes with external heater grooves are casted. A more even heat distribution allows for fewer hot spots in probe body 102 and reduces the power consumption by deicing heater 124.

Those skilled in the art will readily appreciate that because deicing heaters 124 are configured to only deice the port inlet 130 and passage 132. Therefore, the heat can be localized at the port inlet 130 and passage 132 and the amount of heat required is less than that required in traditional TAT probes, resulting in more efficient deicing. Further, those skilled in the art will readily appreciate that while deicing heaters are shown and described herein, the portion of the probe around TAT sensor 122, due to the configuration of inlet 114 and interior flow passage 104, may not need deicing heaters. It is contemplated that impact port 128 is optional and the only inlet can be inlet 114 of interior flow passage 104. Therefore, no deicing heater is required in such embodiments. As a result, DHE would be eliminated and no bleed inlet 136, passages 134 or outlets 138, as described below, would be required.

Referring now to FIGS. 4 and 5, TAT probe 100 includes a plurality of bleed passages 134 defined in probe body 102 between leading edge 110 and interior flow passage 104 aligned with longitudinal axis A with a bleed inlet 136 defined on probe tip 108 for fluid communication of fluid into bleed passage 134, and a plurality of bleed outlets 138 for exhausting fluid out from the bleed passage 134. Bleed inlet 136 is chevron shaped and bleed passage 134 has a cross-sectional shape perpendicular to longitudinal axis A of a chevron. Bleed passage 134 is configured to reduce the heat from the heated boundary region reaching TAT sensor 122 by drawing the heated boundary region into bleed inlet 136 upstream of inlet 114. Each bleed outlet 138 extends individually from bleed passage 134 in a plane perpendicular to longitudinal axis A, e.g. the viewing plane of FIG. 5, and in a plane at a sixty degree angle and at a thirty degree angle with respect to major and minor axes, B and C, respectively, of the elliptical cross-section of probe body 102. Those skilled in the art will readily appreciate that while bleed outlets 138 are shown and described herein extending from bleed passage 134 in a plane perpendicular to longitudinal axis A and in a plane at a sixty degree angle and at a thirty degree angle with respect to major and minor axes, B and C, respectively, of the elliptical cross-section of probe body 102, the angle at and the plane in which bleed outlets 138 extend from bleed passage 134 can vary as needed depending on the desired pressure gradient.

With continued reference to FIGS. 4 and 5, heated fluid flow, e.g. air flow, shown schematically, spills off from leading edge 110 of probe body 102 and enters into bleed inlet 136 and passage 134 prior to entering inlet 114. Heated fluid flow exits from bleed passage 134 by way of bleed outlets 138, therein reducing DHE by substantially avoiding inlet 114, interior flow passage 104, and sensor 122.

Temperature sensor 122 is mounted within interior flow passage 104 for measuring temperature of flow through interior flow passage 104 to determine TAT. Temperature sensor 122 is positioned to substantially avoid heat from the heated boundary region from the deicing heater 124 for reduction of DHE. Those skilled in the art will readily appreciate that a variety of positions can be used depending on the size and shape of interior flow passage 104. Total air temperature probe 100 includes a thermal shield 126 disposed between interior flow passage 104 and temperature sensor 122. Thermal shield 126 is shaped as a cylinder and includes a thermal shield outlet 127, however, those skilled in the art will readily appreciate that thermal shield 126 can have a variety of shapes depending on the location and shape of interior flow passage 104. Thermal shield 126 is configured to shield temperature sensor 122 from radiation from the heated surfaces of probe body 102. There is clearance for fluid passage between thermal shield 126 and interior flow passage 104.

With continued reference to FIGS. 4 and 5, interior flow passage 104 is aligned with the longitudinal axis defined in probe body 102 with an inlet 114 defined on probe tip 108 for fluid communication of fluid into interior flow passage 104, and an outlet 116 for exhausting fluid out from interior flow passage 104. Interior flow passage 104 is shown as a substantially cylinder shaped passage disposed in the probe body 102, however those skilled in the art will readily appreciate that interior flow passage 104 can be any suitable shape, or can be an unbounded passage through the probe body 102. Free stream fluid flow, depicted schematically in FIGS. 4 and 5, such as air, flows around and over the probe body 102. A portion of the fluid flowing over probe tip 108 enters interior flow passage 104 through the inlet 114 and exits through the back of the probe body 102 by way of the outlet 116 due to the pressure gradient between inlet 114 and outlet 116. On its way to outlet 116, fluid flow travels down interior flow passage 104 and thermal shield 126, and into temperature sensor 122.

Those skilled in the art will readily appreciate that the probe body 102, mounting boss and mounting flange and can be made from a variety of suitable materials such as, stainless steel, and/or copper based alloys, such as, Ampcoloy® 940, available from Ampco Metal, S.A., Marly, Switzerland.

The methods and systems of the present disclosure, as described above and shown in the drawings, provide for total air temperature (TAT) probes with superior properties including reduced or eliminated deicing heater error (DHE). While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A total air temperature probe comprising:
    a probe body extending from a probe base to an opposed probe tip along a longitudinal axis and defining a leading edge and opposed trailing edge;
    an interior flow passage aligned with the longitudinal axis defined in the probe body with an inlet defined on the probe tip for fluid communication of fluid into the interior flow passage, and an outlet for exhausting fluid out from the interior flow passage;
    a sloped surface on an exterior of the probe tip extending from the leading edge to the trailing edge, wherein the sloped surface is flush with the leading edge and set in from the trailing edge with respect to the longitudinal axis to define a lip proximate the trailing edge, wherein the sloped surface and the lip are configured to create a high pressure region proximate the inlet of the interior flow passage; and
    a temperature sensor mounted within the interior flow passage for measuring temperature of flow through the interior flow passage to determine total air temperature.

2. A total air temperature probe as recited in claim 1, wherein the probe body has a cross-sectional shape perpendicular to the longitudinal axis that is elliptical.

3. A total air temperature probe as recited in claim 1, wherein the interior flow passage is cylindrical.

4. A total air temperature probe as recited in claim 1, further comprising a mounting boss and a mounting flange, operatively connecting the probe body to an engine.

5. A total air temperature probe as recited in claim 4, wherein the mounting boss has a diameter equal to or less than 0.75 inches (1.905 cm).

6. A total air temperature probe as recited in claim 1, further comprising:
    an impact port with a port inlet defined in the leading edge of the probe and a port passage defined in the probe in fluid communication with the port inlet;
    a deicing heater disposed in the probe body aft the port inlet configured to heat the port inlet and port passage by forming a heated boundary region to reduce ice buildup in the port inlet and port passage; and
    a bleed passage defined in the probe body between the leading edge and the interior flow passage aligned with the longitudinal axis with a bleed inlet defined on the probe tip for fluid communication of fluid into the bleed passage, and a bleed outlet for exhausting fluid out from the bleed passage, wherein the bleed passage is configured to reduce the heat from the heated boundary region reaching the temperature sensor.

7. A total air temperature probe as recited in claim 6, wherein the temperature sensor is positioned to substantially avoid heat from the heated boundary region from the deicing heater for reduction of deicing heater error.

8. A total air temperature probe as recited in claim 6, wherein the bleed inlet is chevron shaped and wherein the bleed passage has a cross-sectional shape perpendicular to the longitudinal axis of a chevron.

9. A total air temperature probe as recited in claim 6, wherein the bleed outlet extends from the bleed passage in a plane perpendicular to the longitudinal axis and in a plane at a sixty degree angle and at a thirty degree angle with respect to a major axis and a minor axis, respectively, of the cross-section of the probe body.

10. A total air temperature probe as recited in claim 6, further comprising a thermal shield disposed between the interior flow passage and the temperature sensor.

11. A total air temperature probe as recited in claim 10, wherein thermal shield is cylindrical and there is clearance for fluid passage between the thermal shield and the interior flow passage.

12. A total air temperature probe comprising:
a probe body extending from a probe base to an opposed probe tip along a longitudinal axis and defining a leading edge and opposed trailing edge;
an interior flow passage aligned with the longitudinal axis defined in the probe body with an inlet defined on the probe tip for fluid communication of fluid into the interior flow passage, and an outlet for exhausting fluid out from the interior flow passage;
a sloped surface on the probe tip extending from the leading edge to the trailing edge, wherein the sloped surface is flush with the leading edge and set in from the trailing edge with respect to the longitudinal axis to define a lip proximate the trailing edge, wherein the sloped surface and the lip are configured to create a high pressure region proximate the inlet of the interior flow passage;
a temperature sensor mounted within the interior flow passage for measuring temperature of flow through the interior flow passage to determine total air temperature;
an impact port with a port inlet defined in the leading edge of the probe and a port passage defined in the probe in fluid communication with the port inlet;
a deicing heater disposed in the probe body aft the port inlet configured to heat the port inlet and port passage by forming a heated boundary region to reduce ice buildup in the port inlet and port passage; and
a bleed passage defined in the probe body between the leading edge and the interior flow passage aligned with the longitudinal axis with a bleed inlet defined on the probe tip for fluid communication of fluid into the bleed passage, and a bleed outlet for exhausting fluid out from the bleed passage, wherein the bleed passage is configured to reduce the heat from the heated boundary region reaching the temperature sensor.

13. A total air temperature probe as recited in claim 12, wherein the temperature sensor is positioned to substantially avoid heat from the heated boundary region from the deicing heater for reduction of deicing heater error.

14. A total air temperature probe as recited in claim 12, wherein the bleed inlet is chevron shaped and wherein the bleed passage has a cross-sectional shape perpendicular to the longitudinal axis of a chevron.

15. A total air temperature probe as recited in claim 12, wherein the bleed outlet extends from the bleed passage in a plane perpendicular to the longitudinal axis and in a plane at a sixty degree angle and at a thirty degree angle with respect to a major axis and a minor axis, respectively, of the cross-section of the probe body.

16. A total air temperature probe as recited in claim 12, further comprising a thermal shield disposed between the interior flow passage and the temperature sensor.

17. A total air temperature probe as recited in claim 16, wherein thermal shield is cylindrical and there is clearance for fluid passage between the thermal shield and the interior flow passage.

18. A total air temperature probe comprising:
a probe body extending from a probe base to an opposed probe tip along a longitudinal axis and defining a leading edge and opposed trailing edge, wherein the probe body is shaped as an elliptical cylinder;
a cylindrical interior flow passage aligned with the longitudinal axis defined in the probe body with an inlet defined on the probe tip for fluid communication of fluid into the interior flow passage, and an outlet for exhausting fluid out from the interior flow passage;
a pitot port with a port inlet defined in the leading edge of the probe and a cylindrical port passage defined in the probe in fluid communication with the port inlet, wherein a plurality of deicing heaters are disposed aft the port inlet and are configured to heat the port inlet and port passage forming a heated boundary region to reduce ice buildup in the port inlet and port passage;
a temperature sensor mounted within the interior flow passage for measuring temperature of flow through the interior flow passage to determine total air temperature, and a thermal shield disposed between the temperature sensor and an interior wall of the interior flow passage, wherein the temperature sensor is positioned to substantially avoid heat from the heated boundary region from the deicing heater for reduction of deicing heater error; and
a sloped surface on the probe tip extending from the leading edge to trailing edge, wherein the sloped surface is flush with the leading edge and set in from the trailing edge with respect to the longitudinal axis to define a lip proximate the trailing edge, wherein the sloped surface and lip are configured to create a high pressure region proximate the inlet of the interior flow passage.

19. A total air temperature probe as recited in claim 18, further comprising a mounting boss and a mounting flange, operatively connecting the probe body to an engine, wherein the mounting boss has a diameter equal to or less than 0.75 inches (1.905 cm).

20. A total air temperature probe as recited in claim 18, further comprising a bleed passage defined in the probe body between the leading edge and the interior flow passage aligned with the longitudinal axis with a bleed inlet defined on the probe tip for fluid communication of fluid into the bleed passage, and a plurality of bleed outlets for exhausting fluid out from the bleed passage, wherein the bleed passage is configured to reduce heat from the heated boundary region reaching the temperature sensor.

21. A total air temperature probe as recited in claim 20, wherein the probe body has a cross-sectional shape perpendicular to the longitudinal axis that is elliptical and wherein each bleed outlet extends separately from the bleed passage in a plane perpendicular to the longitudinal axis and in a plane at a sixty degree angle and at a thirty degree angle with respect to a major axis and a minor axis, respectively, of the cross-section of the probe body.

* * * * *